Jan. 24, 1956
I. A. GLASSER
2,731,981
PRESSURE RELEASE VALVE
Filed Aug. 12, 1952
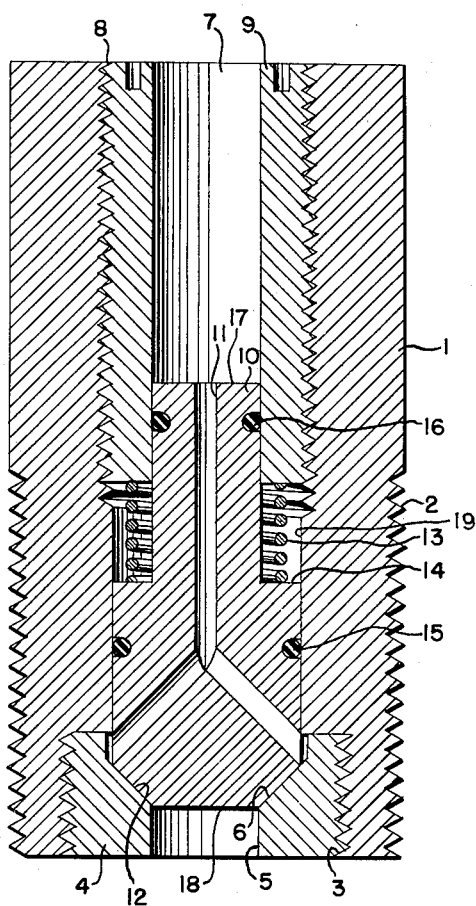
INVENTOR
IRVING A. GLASSER
BY
ATTORNEYS

United States Patent Office 2,731,981
Patented Jan. 24, 1956

2,731,981

PRESSURE RELEASE VALVE

Irving A. Glasser, Pawtucket, R. I., assignor to the United States of America as represented by the Secretary of the Navy Application August 12, 1952, Serial No. 304,048

2 Claims. (Cl. 137—536)

(Granted under Title 35, U. S. Code (1952), sec. 266)

The invention described herein may be manufactured and used by or for the Government of the United States of America for governmental purposes without the payment of any royalties thereon or therefor.

This invention relates to a pressure release valve and more particularly to a means for venting either gases or liquids so as to maintain a predetermined pressure differential above a variable back pressure.

Heretofore pressure valves have been designed to maintain a predetermined differential between a given pressure and a variable back pressure but such devices usually require the use of a bellows or an extra piston. Hence the older valves are, of necessity, rather large and tend to be more costly to produce than the pressure valve described herein.

An object of this invention is to provide a release valve for maintaining a predetermined pressure differential above a variable back pressure.

Another object of this invention is to provide a pressure release or regulating valve which is simple in construction and inexpensive to produce.

Other objects and many of the attendant advantages of this invention will be readily appreciated as the same becomes better understood by reference to the following detailed description when considered in connection with the accompanying drawing wherein the figure represents a longitudinal sectional view of the presently disclosed valve.

There is shown a valve body 1 which is externally threaded as at 2 to adapt it to the particular pressure chamber with which it is to be used. The valve body is internally threaded as at 3 to receive a valve seat 4. The valve seat 4 is provided with a central bore 5 therein and a beveled counterbore 6. The valve body 1 is provided with a central bore 19 therethrough and is internally threaded as at 8 to receive an adjusting sleeve 9. Sleeve 9 is provided with a bore 7 extending therethrough. A valve 10 having a Y-shaped port 11 therethrough is adapted to be disposed within the bore 19 of the valve body and bore 7 of the adjusting sleeve. The lower edge of the valve is beveled as at 12 to fit snugly with the beveled surface 6 of the valve seat 5. A spring 13 is disposed within the bore 19 and is adapted to act between a shoulder 14 formed on the valve and the lower end of the adjusting sleeve 9 to force the valve into engagement with the valve seat. The valve 10 is further provided with O ring seals 15 and 16 to insure a leakproof fitting.

It will be apparent that a valve constructed in the manner described above will be opened by the pressure acting on the area 18 when the force acting on that area exceeds the force acting on the area 17 plus the force exerted by the spring 13. That is to say, the valve 10 will be lifted from its seat when $$A_1P_1 > A_2P_2 + C$$

where
$A_1$ equals the area of the surface 18
$A_2$ equals the area of the surface 17
$P_1$ equals the pressure applied to the surface 18
$P_2$ equals the back pressure applied to the surface 17 and
$C$ equals the force of the spring 13.

Immediately before the valve 10 lifts, and when the forces acting to move the valve upwardly are in equilibrium with the forces acting to move the valve downwardly then $$A_1P_1 = A_2P_2 + C \quad (1)$$

In the valve according to the present invention the area 17 is made equal to the area 18. That is to say, $A_1 = A_2$, Equation 1 may be written $$P_1 - P_2 = \frac{C}{A_1} = \text{a constant}$$

It is thus apparent that the valve will lift from its seat whenever the pressure differential $P_1-P_2$ exceeds the force exerted by the spring 13 and consequently the valve will open at a predetermined pressure differential between the liquid beneath the valve and the liquid exerting pressure on the top of the valve 17 which differential will be independent of the back pressure and dependent only on the force exerted by the spring. It is thus apparent that by adjusting the position of the sleeve 9 to set the force of spring 13, the valve may be set to open at any desired pressure differential between the chamber and the back pressure and that the valve will lift from its seat when this differential is attained regardless of the specific value of the back pressure.

It will be understood that the rate of flow of the fluid set up by the pressure differential between the confined volume in communication with bore 5 and the instantaneous back pressure within bore 7 is high, particularly when, as contemplated by applicant, this predetermined pressure differential is of the order of 50 p. s. i. The integrated value of pressure acting on the surface of the valve seat under this condition is reduced in accordance with the well known law of Bernoulli's theorem whereby the valve does not open beyond a mere crack due to this Bernoulli effect. Furthermore, as the valve is cracked, the flow of fluid across the face 18 thereof causes a reduction in pressure whereby the effective pressure applied to the end 18 and valve face 12 is substantially equal to the pressure against the end portion 18 when the valve is closed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A pressure release valve of the character disclosed comprising, a body having a cylindrical bore therein, a member having a second bore of a greater diameter than the first named bore and in adjacent relation therewith, and a second member having a third bore of the same diameter as the first named bore, all of said bores being in coaxial alignment, a beveled valve seat disposed between said third and second bores and having an enlarged annular recess adjacent said second bore, a movable valve element having a cylindrical portion slidably disposed within said second bore and a cylindrical stem slidably disposed within said first named bore and a tapered valve surface at one end thereof adapted to engage said beveled seat when the valve element is closed, means for sealing said stem to the first named bore and the cylindrical portion of the valve to the larger bore, said sealing means permitting free sliding action of the valve, a branched duct within the valve element for establishing communication with said recessed portion and the first named cylindrical bore of the valve body whereby communication between said first named and third bores is established as the valve element is opened, and means for yieldably biasing the valve element against said seat whereby the valve is opened in response to a pressure differential of predetermined value applied thereto and closed when the pressure differential is reduced to less than said predetermined value.

2. In a device of the class disclosed for maintaining a predetermined pressure differential between a confined fluid and a variable back pressure comprising, a valve body having a bore therethrough, the end portions of said bore being threaded, a valve seat threaded into one end portion of said bore, said valve seat having a bore therein of the same diameter as the said inside sleeve diameter and a counterbore having an annular beveled surface, a sleeve threaded into the other end portion of the bore in said valve body, said sleeve having an inside diameter smaller than the diameter of the valve body bore, a cylindrical valve slideably disposed within the bore and said valve body, said valve being formed with an annular shoulder and having a cylindrical stem slideable in said sleeve, a beveled end portion of said valve adapted to engage the beveled portion of said valve seat to provide a seal therebetween, a bore within said stem and having branches connected with said beveled end portion whereby the stem bore is normally closed when the valve is unoperated, and a spring disposed around said stem between the shoulder of said valve and the end portion of said sleeve, said spring adapted to force said valve yieldably into engagement with said valve seat whereby the pressure differential may be set by adjusting the position of said sleeve and the valve is disengaged from said seat sufficiently to establish communication between said seat bore and said sleeve when the instant pressure differential exceeds said predetermined pressure differential.

References Cited in the file of this patent

UNITED STATES PATENTS

| | | |
|---|---|---|
| 143,644 | Smith | Oct. 14, 1873 |
| 259,109 | Duchemin | June 6, 1882 |
| 811,185 | Ten Eyck | Jan. 30, 1906 |
| 1,175,208 | Vosler | Mar. 14, 1916 |
| 1,348,708 | Garland | Aug. 3, 1920 |
| 2,137,854 | Ordway | Nov. 22, 1938 |
| 2,335,829 | McBride | Nov. 30, 1943 |